Nov. 9, 1943.  A. RAIO  2,334,028
AIRPLANE SAFETY DEVICE
Filed Sept. 22, 1941
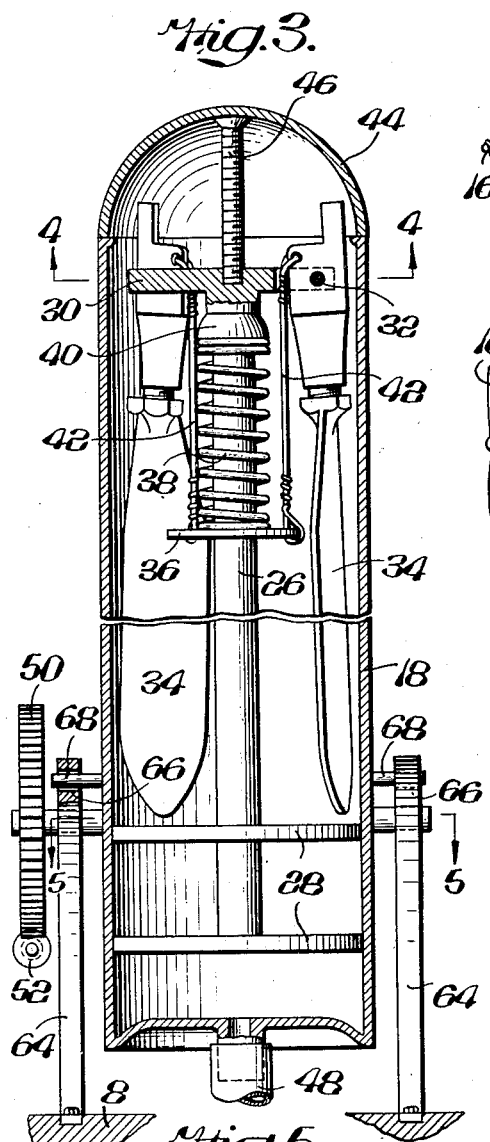
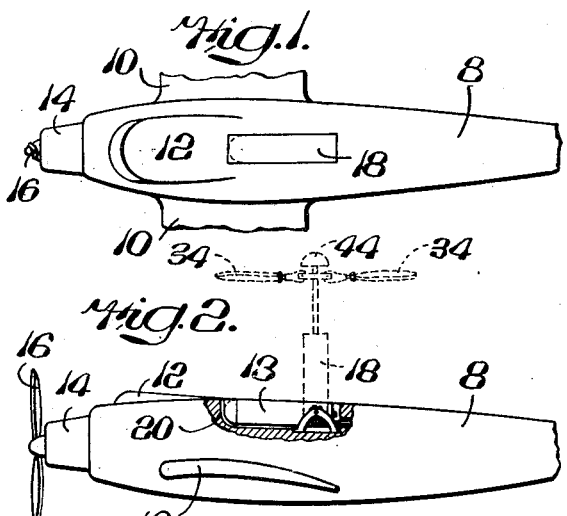
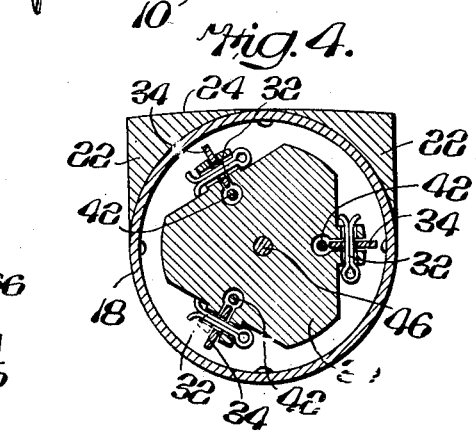
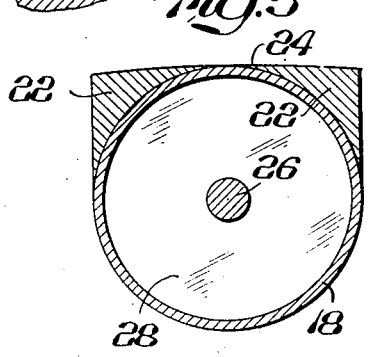
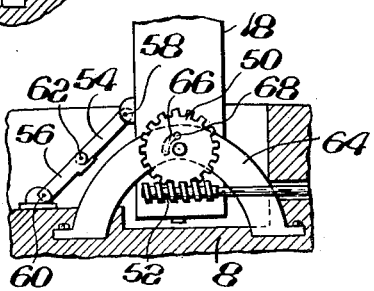
INVENTOR
ANTHONY RAIO
BY Louis Necko
ATTORNEY Patented Nov. 9, 1943

2,334,028

UNITED STATES PATENT OFFICE 2,334,028

AIRPLANE SAFETY DEVICE

Anthony Raio, Philadelphia, Pa.

Application September 22, 1941, Serial No. 411,773

3 Claims. (Cl. 244—139)

My invention relates to a new and useful airplane safety device calculated to insure the safe landing of a heavier than air machine in the event of the stalling of the motor or other damage to such machine.

My invention resides in a novel utilization of the "windmill" of the "Autogiro" or "Helicopter" which embody as their main lifting mechanisms a spindle or shaft extending vertically from the fuselage and at right angles thereto and carrying a series of blades having the proper pitch, such blades being positively driven by the motor when the machine is to rise and being either driven or allowed to idle in the descent as the case may be.

The super structure of an Autogiro or Helicopter above described limits the speed and maneuverability of that class of craft as is well known so that, except for rising from or landing on a relatively small field and for observation purposes, these aircraft lack all of the advantages of the modern civilian or military airship.

It is therefore the object of my invention to combine the streamlined structure of the modern airship with the advantages of safe landing inherent in the Autogiro construction and to render the combination usable at will thereby sacrificing none of the speed and maneuverability of the regular modern airplane and at the same time providing it with all the safety factors of the slow and unwieldy Autogiro type of plane.

Other features of advantage and construction of my novel airplane safety device will be more clearly understood from the following specification and the accompanying drawing in which:

Fig. 1 represents a fragmentary and diagrammatic plan view of an airplane provided with my invention with the latter shown in its inoperative or out-of-the-way position.

Fig. 2 represents a side elevation of Fig. 1 showing the safety device extended into the operative position.

Fig. 3 represents, on an enlarged scale, a view mostly in cross section but partly in elevation, and with some parts omitted, of the details of construction of my novel safety device.

Fig. 4 represents a section on line 4—4 of Fig. 3.

Fig. 5 represents a section on line 5—5 of Fig. 3.

Fig. 6 represents a diagrammatic view illustrating one way in which my novel safety device can be actuated from the dormant or horizontal position of Fig. 1 to the dotted, vertical, operative position of Fig. 2.

The drawing, as far as the structure of the plane itself are concerned, is fragmentary and diagrammatic.

Referring to the drawing in which like reference characters indicate like parts and beginning with Figs. 1 and 2, 8 designates the fuselage of a conventional plane having the wings 10, the cockpit 12, the engine 14 and the propeller 16. It is to be noted that, while I show a monoplane having a single engine mounted in the nose thereof and an open cockpit, my invention does not reside in the structure of the plane itself and what structure is shown is simply by way of illustration. In other words, my invention is equally applicable to any type plane and, while in Figs. 1 and 2 it is shown in a certain location with respect to the fuselage, and while in these figures I show one safety device, it is to be understood that the location of the safety device and the number of safety devices used will depend upon the center of gravity of the particular plane, the convenience of design, and the weight and size of the plane, etc. My novel safety device consists primarily of a cylinder member 18 which is shown in solid lines in Figs. 1 and 2 as embedded in a cut out or cradle 20 formed in the fuselage and which, in dotted lines, is shown in its erected and operative position in Fig. 2.

Referring now to Fig. 5 it will be seen that the cylindrical member 18 is provided on what would be its upper surface when it is in the inoperative position of Figs. 1 and 2 with fillets or extensions 22 which have an upper contour 24 which forms a continuation of the upper contour of the fuselage and completely closes the upper open end of the cradle 20 so that the air foil of the upper contour of the fuselage is not in any way disturbed when the device is in its horizontal, inoperative position, the only thing visible being a very small crack defining the boundary or junction of the safety device with the rest of the fuselage as clearly shown in Fig. 1.

The safety device itself is best seen in Figs. 3 and 4 and consists of a stem 26 which carries one or more plungers or pistons 28 at its lower end and which at its upper end carries a plate 30 to which is pivoted as at 32 a suitable number of propeller blades 34 (three in the present instance). 36 designates a sliding collar which carries a spring 38. The spring 38 is confined between the collar 36 and the upper stop collar or the like 40. 42 designates links which are connected to the collar 36 at their lower ends and to the upper ends of the propellers or the brackets supporting the propellers at their upper ends or at a point above the pivots 32. 44 designates a closure cap which is connected by means of the bolt 46 to the plate 30. When the stem 26 is raised upwardly to extend beyond the upper edge of the cylinder 18, the spring 38 automatically expands thus pushing downwardly against the collar 36 and therefore pulling downwardly on the links 42 which in turn pull downwardly at the upper ends of the propellers or the brackets supporting the same thereby forcing the propeller blades into the horizontal position shown in dotted lines in Fig. 2. The propellers 34 are mounted for free rotation about the stem 26. When it is desired to fold the device into its inoperative position as shown in Fig. 3, the collar 36 is pushed upwardly to compress the spring 38 whereupon the propellers 34 drop into the substantially vertical position shown in Fig. 3 and in that position they are inserted into the cylinder 18 and the cap 44 is brought down to close the upper end of the cylinder 18. In order to raise the stem 26 I have provided the cylinder 18 with a nipple 48 which is connected by means (not shown) with a source of compressed air, hydraulic pump, or the like which the pilot can operate manually as a conventional hydraulic automobile jack. Since this is a well known construction it is deemed unnecessary to either show or describe it in detail.

While any suitable means may be employed for bringing the cylinder 18 into its lower, horizontal, inoperative position and for raising it into it vertical, operative position, I have, in order to make a complete disclosure, shown only one way in which this can be accomplished. Thus I secure to one or both sides of the cylinder 18 a gear 50 which is engaged by a worm 52 and I also provide the collapsible links 54 and 56 pivoted at 58 and 60 and hinged together at 62. Also, on one or both sides of the cylinder 18 I provide the arcuate yoke or yokes 64 which are provided with the slot or slots 66 in which move the guide pin or pins 68. When the worm 52 is turned in one direction, the gear 50 will turn in clockwise direction thus raising the cylinder 18 from the horizontal position into the vertical position, it being noted that the pin 68 when it reaches the right hand end of the slot 66 acts as a stop to limit the movement of the cylinder 18. When the worm 52 is turned in the opposite direction the gear 50 will turn in counter-clockwise direction thus lowering the cylinder 18 in an arcuate path to the left hand side of Fig. 6 into its cradle 20. The links 54 and 56 serve as reinforcement against wind pressure when the cylinder 18 is in the vertical position and these links naturally collapse or fold upon each other when the cylinder 18 is in its horizontal position. A suitable crank (not shown) is provided for actuating the worm 52 or a suitable hydraulic pump or jack to provide the necessary power may be utilized. Again, since this is a well known expedient, it is deemed unnecessary to show or describe it in greater detail.

The operation is as follows:

Starting with a grounded plane the safety device packed as shown in Fig. 3 rests in the cradle 20 where, as above stated, it forms a continuation of the upper surface of the fuselage and does not in any way interfere with the streamlining nor present any obstruction. As long as the airplane is flying normally the safety device remains in that position. If the landing gear is lost, or if the motor stalls, or if other damage should occur which would cause the plane to crash, the operator first actuates the worm 52 to cause the cylinder 18 to stand up vertically with respect to the fuselage and the pilot next introduces pressure through the nipple 48 into the cylinder 18 below the plunger or plungers 28 thus forcing the stem 26 outwardly and upwardly from the cylinder 18 whereupon the expansion of the spring 38 automatically spreads the propeller blades 34 into their horizontal, operative position. The pressure of the air against the propeller blades 34 will cause them to rotate about the stem 26 and this will result in gently floating the ship down to earth without serious damage. If desired, means can be provided such as those now used on Autogiros and the like for tilting the stem 26 or the cylinder 18 or for otherwise varying the pitch of the propellers 34 so as to provide a certain amount of directional control thereby enabling the pilot to avoid a tree, or a high tension wire, or water falls immediately below him.

Having thus described my invention, what I claim as new and desire to secure by Letters Patent, is,

1. A safety device for heavier than air flying machines comprising, a member having a recess in its upper surface, a casing adapted normally to rest in said recess, a stem in said casing, hinged propeller blades carried by said stem and normally enclosed in said casing, means for raising said casing from said recess, means for projecting said stem from said casing, and means for actuating said propeller blades into a position substantially normal to said stem when said stem is projected out of said casing.

2. A safety device for heavier than air flying machines comprising, a member having a recess in its upper surface, a casing adapted normally to rest horizontally in said recess, a stem normally enclosed within said casing, hinged propeller blades loosely carried by said stem and also normally enclosed within said casing in a position substantially parallel with the axis of said stem, means for raising said stem from said recess into a vertical position with respect to the upper surface of said machine, means for ejecting said stem and said propeller blades from said casing, and means for automatically actuating said blades into and retaining them in a horizontal position.

3. A safety device for heavier than air flying machines comprising, a member having a recess in its upper surface, a casing adapted normally to rest horizontally in said recess, hinged propeller blades normally enclosed in said casing and means for raising said casing from said recess and for projecting said propeller blades from said casing, the contour of the upper surface of said casing, when the latter is resting in said recess, being a continuation of and flush with the surrounding portion of the upper surface of said member.

ANTHONY RAIO.